May 23, 1967 T. E. TUCCINARDI 3,321,702
MAGNETOMETER AND ELECTROMETER UTILIZING VIBRATING REEDS
WHOSE AMPLITUDE OF VIBRATION IS A MEASURE OF THE FIELD
Filed June 4, 1964 2 Sheets-Sheet 1

INVENTOR,
THOMAS E. TUCCINARDI
BY Harry M. Saragovitz,
Edward J. Kelly, Herbert Berl & J. D. Edgerton
ATTORNEYS

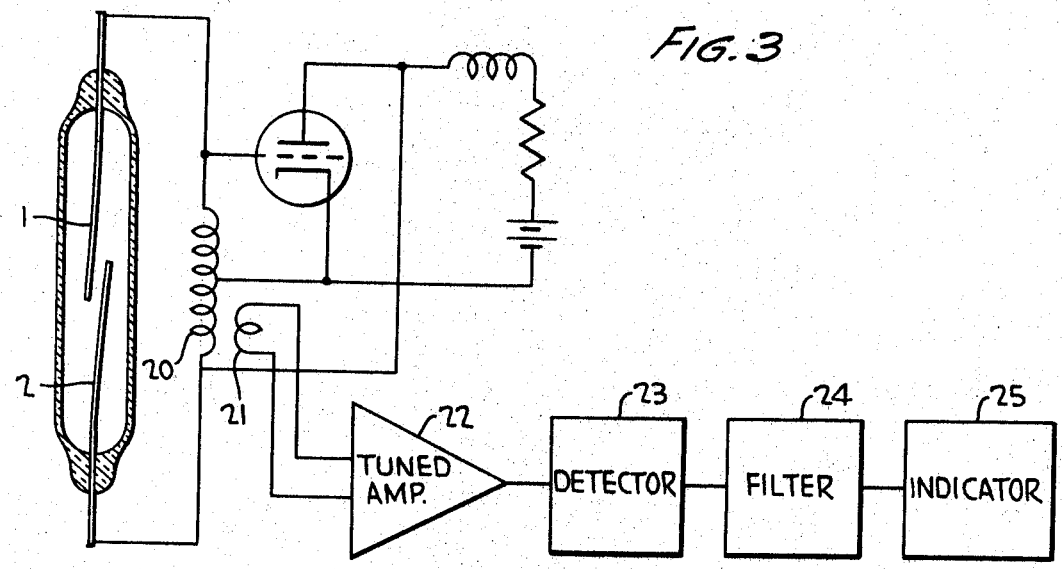
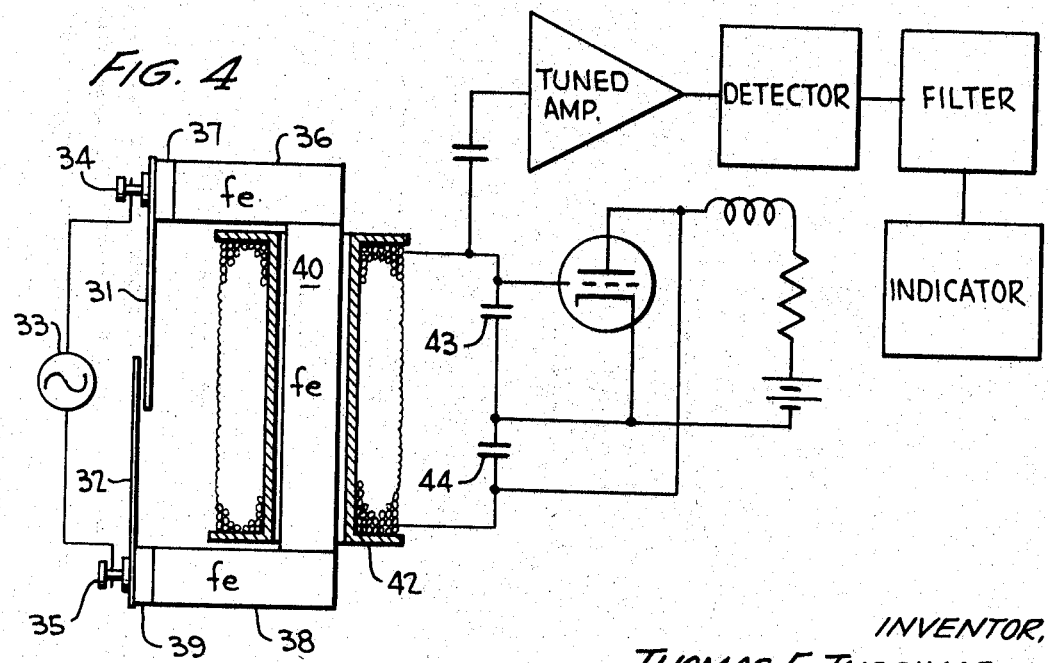

United States Patent Office 3,321,702
Patented May 23, 1967

3,321,702
MAGNETOMETER AND ELECTROMETER UTILIZING VIBRATING REEDS WHOSE AMPLITUDE OF VIBRATION IS A MEASURE OF THE FIELD
Thomas E. Tuccinardi, Wheaton, Md., assignor to the United States of America as represented by the Secretary of the Army
Filed June 4, 1964, Ser. No. 372,726
8 Claims. (Cl. 324—43)

The invention described herein may be manufactured and used by or for the Government of the United States of America for governmental purposes without the payment to me of any royalty thereon.

The present invention relates to apparatus for the measurement of small magnetic or electric field intensities and more particularly to a vibrating magnetometer and electrometer.

Classically, the measurement of the terrestrial magnetic field is made in two steps: First, a bar magnet is suspended at the end of a fiber to form a pendulum, and the period of the pendulum is measured. Second, the angle of deflection of a compass needle by the bar magnet is measured. From these measurements, the horizontal component of the terrestrial magnetic field and the magnetic moment of the magnet are calculated. Measurement of the magnetic field in this manner is not suitable for field work and does not provide a direct indication of field strength. Direct reading magnetometers have been constructed which employ a bismuth wire which is placed in the magnetic field to be measured. The resistance of the bismuth wire increases in a magnetic field, and a measurement of the resistance provides a direct indication of the magnetic field. These instruments, however, are extremely sensitive to temperature due to the considerable resistance-temperature coefficient of the bismuth wire. In addition, this device is only useful for very strong magnetic fields. Another type of direct reading magnetometer is the flux-gate magnetometer which is extensively used in the measurement of terrestrial magnetism. This instrument employs a saturable core which is excited to near saturation by an alternating current source. When there exists no steady external field, each half cycle of the alternating flux is symmetrical. When the core is in the presence of an external field, it will saturate more readily during one part of the cycle of the exciting source than during the other part of the cycle. Under this condition the alternating magnetic flux in the core is asymmetrical. This asymmetry manifests itself in an even harmonic of the drive frequency. This harmonic output is used as a direct measure of the strength of the field. This system depends on magnetic core nonlinearity and carefully balanced windings requiring special circuit and fabrication techniques.

Classically, the measurement of electric fields is made by measuring mechanical forces due to electrostatic attraction or repulsion. Perhaps the best known of this type of instrument is the quadrant electrometer which has a thin, oblong metal plate suspended horizontally in the interior of a flat metal box cut into four quadrants. One pair of opposite quadrants and the suspended strip are connected to the source of potential, the other pair of quadrants is grounded. This causes the strip to turn toward the grounded pair against the torsion of the suspended wire. This instrument is extremely delicate, and construction and calibration of it are crtical. The known electrometers which operate on the basis of a measurement of forces due to the electrostatic field caused by a charge distribution have generally been replaced by the vacuum tube electrometer. This instrument is basically a direct-coupled amplifier having a specially designed grid circuit which draws negligible grid current. Precautions must be taken in the design of the instrument to avoid surface and leakage currents. Indication is provided by a delicate, precision galvanometer.

It is therefore an object of the present invention to provide an apparatus for the measurement of small magnetic fields which is suitable for field work and provides a direct indication of field strength.

It is another object of this invention to provide an apparatus for the measurement of small magnetic fields which is substantially linear in operation and relatively independent of temperature variations.

It is a further object of the instant invention to provide an apparatus for the measurement of small electric fields which is rugged and provides a direct indication of field strength.

According to the present invention, the foregoing and other objects are attained by providing two electrically conducting and flexible reeds each rigidly supported at one end and having their free ends overlapping and deflectable toward each other under the influence of attractive forces created by a field, means for generating a steady-state oscillating field between the overlapping ends having a frequency equal to the mechanical resonant frequency of the reeds thereby causing the reeds to have a component of vibration of twice their mechanical resonant frequency, and means for detecting the variation in amplitude of the component of vibration of the reeds at their mechanical resonant frequency which is caused by the field to be measured together with the steady-state oscillating field.

The specific nature of the invention, as well as other objects, aspects, uses and advantages thereof, will clearly appear from the following description and from the accompanying drawings, in which.

FIG. 3 is a partially schematic and partially block diagram of an apparatus for detecting the amplitude of vibration of the reeds at their mechanical resonant frequency which uses an oscillator which is frequency modulated by the vibration of the reeds; and FIG. 4 is a view partially in cross-section and partially schematic showing the reed structure and the source of the exciting field to be used in an apparatus for measuring weak electric fields together with a partially schematic and partially block diagram of an apparatus for detecting the amplitude of vibration of the reeds at their mechanical resonant frequency.

Figure 1:
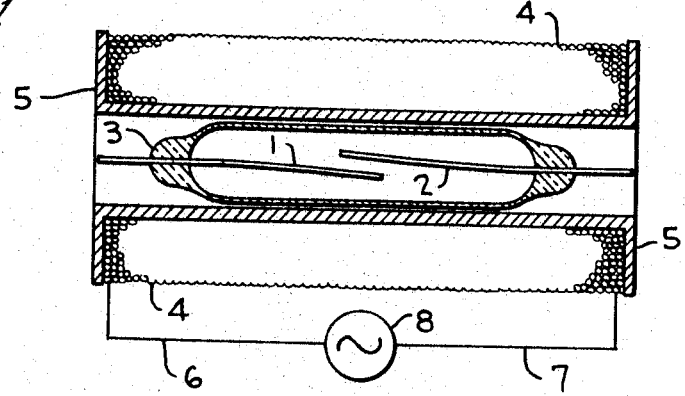
FIG. 1 is a view partially in cross-section and partially schematic showing the reed structure and the exciting field coil to be used in an apparatus for measuring weak magnetic fields.

Referring now to the drawings wherein like reference numerals designate identical or corresponding parts throughout the several views and more particularly to FIG. 1, wherein 1 and 2 are two flexible reeds of magnetic material which are disposed with a glass envelope 3. The reeds are rigidly supported at one end by the glass envelope, and their free ends overlap but do not touch. This structure will be recognized as the well-known reed switch. Surrounding the glass envelope is a coil 4 which is wound on a bobbin 5. The coil is connected by wires 6 and 7 to a source of alternating current 8. An alternating magnetic flux is made to appear in the gap between the overlapping ends of the two reeds due to the alternating magnetic field generated by the coil and the source of alternating current. In addition, a constant flux appears in the gap due to the field to be measured. If the flux due to the field to be measured is expressed as $\phi_1$ and the flux generated by the alternating magnetic field is expressed as $\phi_2 \sin \omega t$ where $\omega$ is equal to $2\pi$ times the frequency of the source of alternating current, then the force between the two reeds is expressed as follows:

$$f = \frac{(\phi_1 + \phi_2 \sin \omega t)^2}{8\pi A}$$

where $A$ is the effective area of overlap between the reeds. Expanding this expression there is obtained the following:

$$f = \frac{\phi_1^2 + \phi_1\phi_2 \sin \omega t + \phi_2^2 \sin^2 \omega t}{8\pi A}$$

$$f = \frac{\phi_1^2}{8\pi A} + \frac{\phi_1\phi_2 \sin \omega t}{8\pi A} + \frac{\phi_2^2}{16\pi A} - \frac{\phi_2^2 \cos 2\omega t}{16\pi A}$$

Notice that two constant terms appear. The first term is due to the flux $\phi_1$ which is to be measured, and the third term is due to the peak flux $\phi_2$ of the drive signal. The effect of both of these terms is to bias the overlapping ends of the reeds toward one another. The present invention in accomplishing its desired objectives ignores these terms. This can be done since the terms are constant. On the other hand, the second and fourth terms of the above expression are alternating, and it is due to these two components of the force between the reeds that the reeds vibrate. The second term causes a component of vibration at the drive frequency, and the fourth term causes a component of vibration at twice the drive frequency. Characteristically, the flux $\phi_1$ which is the flux to be measured is very small compared with $\phi_2$; therefore, the vibration of the reeds would normally be primarily due to the fourth term of the force expression. As may be seen, the second term is due in part to the flux $\phi_1$ whereas the fourth term is due entirely to the flux $\phi_2$. If the drive frequency is made to be equal to the mechanical resonant frequency of the reeds, the second term of the expression will be multiplied by Q. Now small changes in the flux $\phi_1$ will appear as changes in the fundamental component of the reed vibration multiplied by Q. This component thus "amplified" may be readily detected, and its amplitude is a direct function of the field to be measured.

Figure 2:
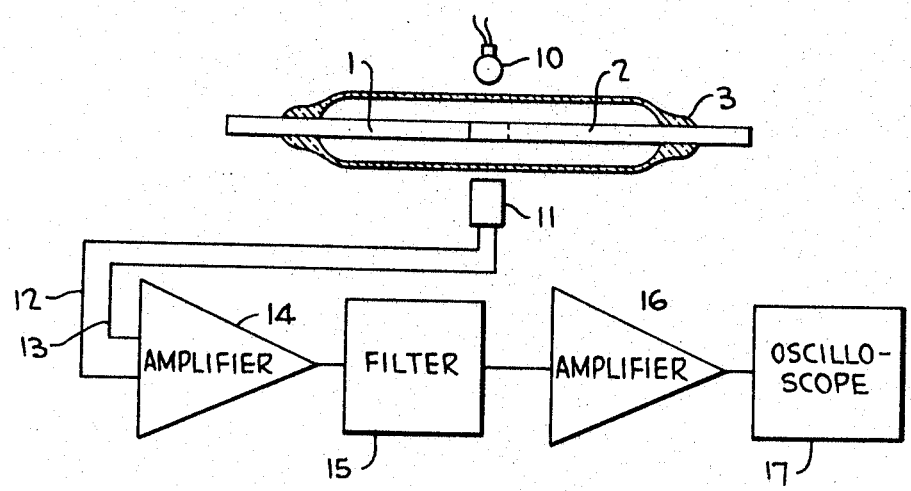
FIG. 2 is a block diagram of an apparatus for detecting the amplitude of vibration of the reeds at their mechanical resonant frequency which uses a photo-electric detector.

Referring now to FIG. 2 there is shown an apparatus for detecting the component of vibration of the reeds which is equal in frequency to the resonant frequency of the reeds. The reeds 1 and 2 and their glass envelope are viewed from the top in this figure. A light source 10 is positioned to illuminate the perpendicular gap area between the reeds, and a photocell 11 is positioned to detect any variation in the illuminated area due to the vibration of the reeds. The photocell is connected by way of wires 12 and 13 to an amplifier 14 which amplifies the weak signal of the photocell to usable level. The output of amplifier 14 is passed through a filter 15 which has a pass band centered on the resonant frequency of the reeds. The output of the filter which is entirely due to the component of vibration which has an amplitude directly proportional to the field to be measured is amplified by amplifier 16 and displayed by the oscilloscope 17. The amplitude of the trace on the oscilloscope provides a measure of the field which is desired to be measured.

Another apparatus for detecting the component of vibration of the reeds which has a frequency equal to the resonant frequency of the reeds is shown in FIG. 3. In this apparatus the reeds 1 and 2 form the capacitive reactance of the tank circuit which includes the inductor 20 of a suitable oscillator such as, for example, a Hartley oscillator. The effect of the vibration of the reeds is to frequency modulate the output of the oscillator. Pick-up coil 21 is inductively coupled to the inductor 20 and provides an input signal to the tuned voltage amplifier 22. The output of the amplifier is connected to the detector 23 which provides as an output the modulation signal produced by the vibration of the reeds. That part of the modulation signal which has a frequency component equal to the resonant frequency of the reeds is passed by the filter 24 to a suitable indicator 25. An obvious modification of the apparatus shown in FIG. 3 is to connect the output of the oscillator to an antenna and radiate the frequency modulated output. The radiated signal can then be received by a communications receiver.

FIG. 4 shows an apparatus for measuring weak electric fields. Reeds 31 and 32 are shown rigidly supported at one end and having their free ends overlapping in a manner similar to the reed switch structure shown in FIG. 1. A source of alternating voltage 33 is connected across the reeds by way of terminals 34 and 35. If the voltage generated by the source 33 is expressed as $e_2 \sin \omega t$ and the voltage across the reeds which produces the electric field to be measured is expressed as $e_1$, then the expression for the force between the reeds is as follows:

$$f = \left[\frac{e_1^2}{8\pi a^2} + \frac{e_1 e_2 \sin \omega t}{8\pi a^2} + \frac{e_2^2}{16\pi a^2} - \frac{e_2^2 \cos 2\omega t}{16\pi a^2}\right] A$$

where $a$ is the normal distance between the reeds. As may be seen, the form of this expression is the same as in the case of a magnetic field. The principle of operation is the same for weak electric fields as for weak magnetic fields; therefore, the drive signal is made to have a frequency equal to the mechanical resonant frequency of the reeds, and that component of the vibration of the reeds having a frequency equal to the drive frequency is detected. Detection of the vibration of the reeds may be accomplished photoelectrically as in FIG. 2. Alternatively, FIG. 4 shows how an oscillator may be frequency modulated and the modulating signal detected. Reed 31 is mechanically attached to a soft iron bar 36 but is electrically insulated therefrom by insulator 37. Similarly, reed 32 is attached to soft iron bar 38 and electrically insulated therefrom by insulator 39. A third soft iron bar 40 has one end contacting the iron bar 36 and the other end contacting the iron bar 38. The structure thus far described is a magnetic circuit having a variable air gap defined by the overlapping ends of the reeds. Vibration of the reeds causes a variation of the reluctance of the magnetic circuit. A coil 41 wound on a bobbin 42 encircles a part of the magnetic circuit and, due to the variation in reluctance, appears as a variable inductor. The coil in combination with capacitors 43 and 44 comprise the tank circuit of a suitable oscillator such as, for example, a Colpitts oscillator. The vibration of the reeds, therefore, causes the output of the oscillator to be frequency modulated. The modulation signal is then detected, filtered, and displayed as in FIG. 3. As a modification of detection system shown in FIG. 4, the soft iron bar 40 may be replaced by a permanent magnet having one pole contacting the iron bar 36 and the other pole contacting the iron bar 38. In this arrangement the vibration of the reeds 31 and 32 causes the flux to vary in the magnetic circuit. This variation in flux will induce a variable voltage across the coil 41. The coil, instead of being connected in a tank circuit of an oscillator as shown in FIG. 4, would be connected to a suitable filter and display circuit as represented, for example, by filter 15, amplifier 16, and oscilloscope 17 shown in FIG. 2.

It will be apparent that the embodiments shown are only exemplary and that various modifications can be made in construction and arrangement within the scope of the invention as defined in the appended claims.

I claim as my invention:

1. An apparatus for the measurement of small magnetic or electric field intensities comprising:
   (a) first and second electrically conducting and flexible reeds each rigidly supported at one end and having their free ends overlapping but not touching and deflectable each toward the other under the influence of attractive forces created by a field existing therebetween,
   (b) means for generating a steady-state oscillating field between the overlapping reeds having a frequency equal to the mechanical resonant frequency of the reeds thereby causing said reeds to have a component of vibration of twice their mechanical resonant frequency, and (c) means for detecting the variation in amplitude of the component of vibration of the reeds at their mechanical resonant frequency which is caused by the field to be measured together with the steady-state oscillating field.

2. An apparatus as defined in claim 1 wherein said means for detecting comprises:

(a) a source of light positioned to illuminate the perpendicular area between the overlapping ends of said first and second reeds, (b) means for sensing the variations in the illuminated area caused by the vibration of said reeds, (c) a filter connected to said means for sensing and providing as an output only those variations which have a frequency equal to the mechanical resonant frequency of said reeds, and (d) means connected to said filter for providing an indication of the peak amplitude of the output of said filter.

3. An apparatus as defined in claim 1 wherein said means for detecting comprises:

(a) an oscillator which is frequency modulated by the vibration of said first and second reeds, (b) means connected to said oscillator for detecting the modulation signal of the frequency modulated output signal of said oscillator, (c) a filter connected to said means for detecting and providing as an output that portion of the modulation signal having a frequency equal to the mechanical resonant frequency of said reeds, and (d) means connected to said filter for providing an indication of the peak amplitude of the output of said filter.

4. An apparatus as defined in claim 1 for measuring small magnetic field intensities wherein said means for generating produces a steady-state oscillating magnetic field between the overlapping reeds and comprises:

(a) a source of steady-state oscillating current, and (b) an electrical winding connected to said source of current and encircling said first and second reeds.

5. An apparatus as defined in claim 4 wherein said means for detecting comprises:

(a) an oscillator having a tank circuit comprising an inductor electrically connected across said first and second reeds which provide the capacitive reactance of the tank circuit and the vibration of which causes the oscillator to be frequency modulated, (b) means connected to said oscillator for detecting the modulation signal of the frequency modulated output signal of said oscillator, (c) a filter connected to said means for detecting and providing as an output that portion of the modulation signal having a frequency equal to the mechanical resonant frequency of said reeds, and (d) means connected to said filter for providing an indication of the peak amplitude of the output of said filter.

6. An apparatus as defined in claim 1 for measuring small electric field intensities wherein said means for generating produces a steady-state oscillating electric field between the overlapping reeds and comprises: a source of steady-state oscillating voltage electrically connected to said first and second reeds.

7. An apparatus as defined in claim 6 wherein said means for detecting comprises:

(a) a bar of soft iron having first and second ends, said first end being magnetically connected to said first reed but electrically insulated therefrom and said second end being magnetically connected to said second reed but electrically insulated therefrom to provide a magnetic circuit the reluctance of which varies due to the variation in the gap between said first and second reeds, (b) an oscillator having a tank circuit comprising an electrical winding which encircles at least a portion of the magnetic circuit and the inductance of which varies due to the variation in the reluctance of the magnetic circuit caused by the vibration of said first and second reeds thereby causing the oscillator to be frequency modulated, (c) means connected to said oscillator for detecting the modulation signal of the frequency modulated output signal of said oscillator, (d) a filter connected to said means for detecting and providing as an output that portion of the modulation signal having a frequency equal to the mechanical resonant frequency of said reeds, and (e) means connected to said filter for providing an indication of the peak amplitude of the output of said filter.

8. An apparatus as defined in claim 6 wherein said means for detecting comprises:

(a) a permanent magnet having one pole magnetically connected to said first reed but electrically insulated therefrom and having the other pole magnetically connected to said second reed but electrically insulated therefrom to provide a magnetic circuit in which the overlapping reeds are a variable gap, (b) an electrical winding which encircles at least a portion of the magnetic circuit and which has a variable voltage induced thereacross due to the variation in flux in the magnetic circuit caused by the vibration of said first and second reeds, (c) a filter connected to said electrical winding and providing as an output that portion of said variable voltage which has a frequency equal to the mechanical resonant frequency of said reeds, and (d) means connected to said filter for providing an indication of the peak amplitude of the output of said filter.

No references cited.

WALTER L. CARLSON, *Primary Examiner.*

R. J. CORCORAN, *Assistant Examiner.*